TWO-WAY FACSIMILE TELEGRAPH SYSTEM

Original Filed June 16, 1948

4 Sheets-Sheet 1

INVENTORS
G. H. RIDINGS
R. J. WISE
G. B. WORTHEN

BY A. A. Thomas

ATTORNEY

TWO-WAY FACSIMILE TELEGRAPH SYSTEM

Original Filed June 16, 1948

4 Sheets-Sheet 2

INVENTORS
G. H. RIDINGS
R. J. WISE
G. B. WORTHEN

BY A. A. Thomas
ATTORNEY

TWO-WAY FACSIMILE TELEGRAPH SYSTEM

Original Filed June 16, 1948 4 Sheets-Sheet 3

INVENTORS
G. H. RIDINGS
R. J. WISE
G. B. WORTHEN
BY
A. A. Thomas
ATTORNEY

Sept. 14, 1954 G. H. RIDINGS ET AL 2,689,273

TWO-WAY FACSIMILE TELEGRAPH SYSTEM

Original Filed June 16, 1948 4 Sheets-Sheet 4

INVENTORS
G. H. RIDINGS
R. J. WISE
G. B. WORTHEN

BY A. A. Thomas
ATTORNEY

UNITED STATES PATENT OFFICE 2,689,273

TWO-WAY FACSIMILE TELEGRAPH SYSTEM

Garvice H. Ridings, Summit, and Raleigh J. Wise, Arlington, N. J., and George B. Worthen, New York, N. Y., assignors to The Western Union Telegraph Company, New York, N. Y., a corporation of New York Original application June 16, 1948, Serial No. 33,354. Divided and this application April 4, 1951, Serial No. 219,222

6 Claims. (Cl. 178—69.5)

This invention relates to the art of facsimile transmission and its general object is to provide a two-way facsimile telegraph system between a main office and a subscriber who has a machine capable of recording and transmitting messages. A machine suitable for use in our system is disclosed in the pending application of G. H. Ridings et al., Ser. No. 33,354, filed June 16, 1948, of which the present case is a division filed in response to an official requirement.

The subject matter of this application is a system by which the subscriber's transceiver is placed in operative communication with either a recorder or a receiver at the main office. This system includes novel control circuits designed to make the use of a subscriber's machine as simple as possible, so that even an unskilled office worker can attend to the machine for transmitting and receiving.

The subscriber's machine has only two manual controls, a start button, and a send-receive switch. For transmitting, the attendant loads a message on a scanning drum, moves the switch to send position, and pushes the start button. From there the machine takes care of itself. Similarly, when using the machine as a receiver, the attendant places a recording blank on the drum, throws the switch to "Receive" position and presses the start button. For each machine we provide an amplifier and control unit adapted to operate for transmitting and receiving. Such parts in the unit as function only for transmitting are automatically cut out for recording, and vice versa.

Two distant machines are placed in facsimile communication through a pair of cross-connected lines over which the control and signal circuits operate. When the attendant at the transmitter pushes the start button, the drum starts rotating and a buzzer at the receiver calls the attendant who then loads his drum with a blank and presses the start button. The operation of this button at the receiver puts power on the receiver, automatically causes the drums of the two machines to phase, and starts the scanning carriage at the transmitter.

The automatic phasing of the two machines is accomplished by a novel method which involves the drifting of one drum motor with respect to the other until the proper phase relationship is established between the two rotating drums. This phasing apparatus is so simple that it contributes to the economy of the machine both as to space and cost.

Since our machine is inherently capable of transmitting and recording, we include certain safety features to guard against the improper use of the machine. Thus, if a machine is to transmit a message and is accidentally set up as a recorder, a signal light will appear to warn the attendant, and if he should operate the start button under that condition, the receiver at the other end of the line will not be called. Similarly, if a machine is set up as a transmitter after a call has been received, a signal light will apprise the operator of the wrong set-up and he will throw his switch to the proper position.

Our machine and system can be set up to work equally well from a transmitting copy composed of insulating characters on a conducting sheet or a copy with conducting characters on an insulating sheet. Further, it is immaterial whether the original message is a positive copy (black on white) or a negative copy (white on black). It is only necessary that the characters and the paper have different electrical resistances. In either case the recorder will make a positive copy due to the fact that signals are sent to the line only when the transmitting stylus scans the characters on the sheet. However, our system can be adjusted to send out signals when the transmitter stylus scans the background of the sheet.

In the practical application of our invention, two machines can be connected for a point to point service, as from the main office of a commercial house to each of its branches, or a customer's machine can be connected with the main telegraph office for the quick pickup and delivery of telegrams. In the first instance the home office of a business can telegraph directly to its branches, and in the other case a telegram to anywhere can be facsimiled directly to the main office for dispatch to its destination. This arrangement not only dispenses with the old-fashioned call boxes previously installed in business offices to summon a telegraph boy, but it also enables the main office to transmit a received telegram instantly to a customer's machine.

The novel features and practical advantages of our invention will be fully understood from a description of the accompanying drawings which illustrate a commercial form of our facsimile system as actually used. In these drawings:

Figs. 1 and 2 together illustrate the control and amplifier circuits of the machine when used as a transmitter;

Figures 1, 1A:
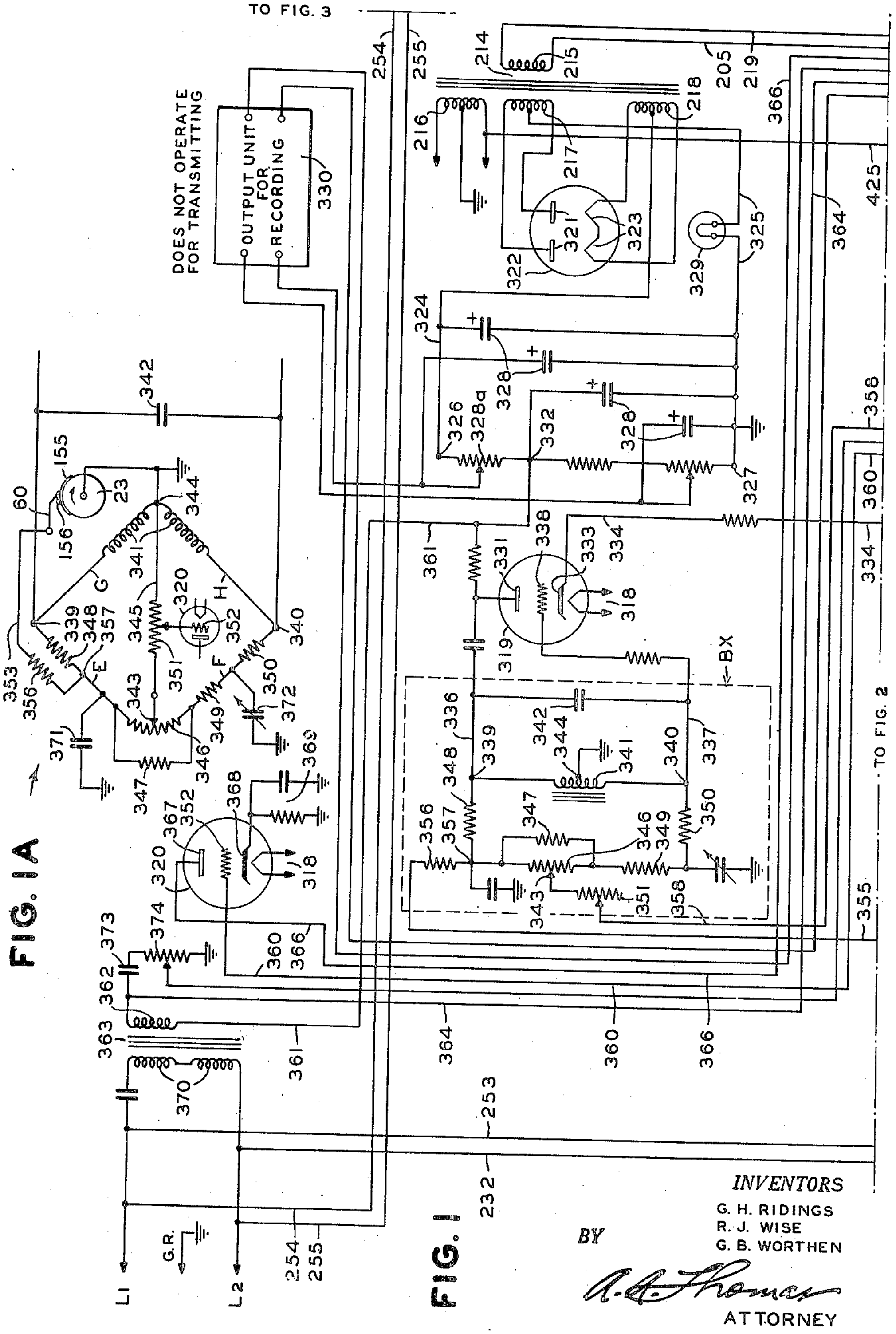
Fig. 1A shows separately a bridge network included in Fig. 1.

Since the construction of the subscriber's transceiver used in the present system is fully illustrated and described in the parent application, the circuit diagrams shown in the accompanying drawings include only such elements of the machine as are required to explain the operation of the system. Therefore, it will suffice to point out briefly the functions of those elements which are presented merely in diagrammatic form.

The subscriber's machine has a rotary drum 23 on which copy to be scanned is mounted, and this drum is operated by a small synchronous motor 26. A commutator 38 of insulating material always rotates with the drum shaft. This commutator has a metal contact 39 which is permanently grounded to the metal frame of the machine, and a conductor brush 40 which engages the contact once for every revolution of the drum shaft. The brush 40 is therefore grounded every time it touches the contact 39. The part 38 is called the phasing commutator because it controls the automatic phasing of two connected machines, as will be explained later.

The drum 23 is of such size as to have a sheet 48 properly mounted thereon for scanning either to transmit or receive. For transmitting, the sheet 48 constitutes the subject copy, such as a telegram, and for receiving it is a blank of electrosensitive paper on which the transmitted message is recorded in facsimile. The sheet on drum 23 is scanned by a stylus 60 for transmitting as well as recording. The stylus is mounted on a slidable carriage (not shown) arranged to move the stylus slowly in a rectilinear path along the drum, as fully set forth in the parent application of this case.

The slidable stylus carriage is operated by a small synchronous motor 101, which we call the stylus motor to distinguish it from the drum motor 26. A buzzer 127 in the machine housing operates only when the machine is used as a receiver and serves as a call signal for the attendant. The machine is further provided with a send-receive switch 137, a start button 138, and a warning lamp 140 which goes on automatically when the machine is inadvertently set up for the wrong operation. A normally closed switch 144, called the end-of-message switch, is opened by the stylus carriage at the close of a scanning operation when the carriage strikes the projecting spring arm 148 of the switch. As will appear later, the opening of switch 144 turns the power off and stops the machine. The switch 148 may also be operated by hand when it is necessary to stop the machine at any time.

When the machine is used as a transmitter, the stylus 60 will operate on a record sheet where the characters and the paper have different electrical resistances. For example, the message sheet may comprise a conducting base stock, such as carbon impregnated paper, which is covered with a thin coating of insulating material. The message is written with a soft graphite pencil which bears conducting marks on the coating and those marks penetrate to the conducting base. Therefore, when the stylus 60 touches a mark, it establishes a conducting path to the grounded metal drum. When the stylus rides over an unmarked area of the sheet, the high resistance of the coating is interposed in the stylus circuit.

In the message sheet 155, indicated schematically in Fig. 1A, the sheet is conducting, as of black carbon, and the message is typed or written thereon in insulating characters 156 formed of suitable wax material. Here, when the stylus 60 rides over the unmarked carbon surface 155, there is a direct conducting path to the grounded metal drum 23. However, when the stylus touches an insulating character 156, the high resistance of this character separates the stylus from the metal drum. We have, then, in either case a message sheet on which the characters and the unmarked background have different resistances, and these resistance variations in the stylus circuit are utilized to generate facsimile signals in the transmitter. This will be made clear in the description of the circuits.

Figure 2:
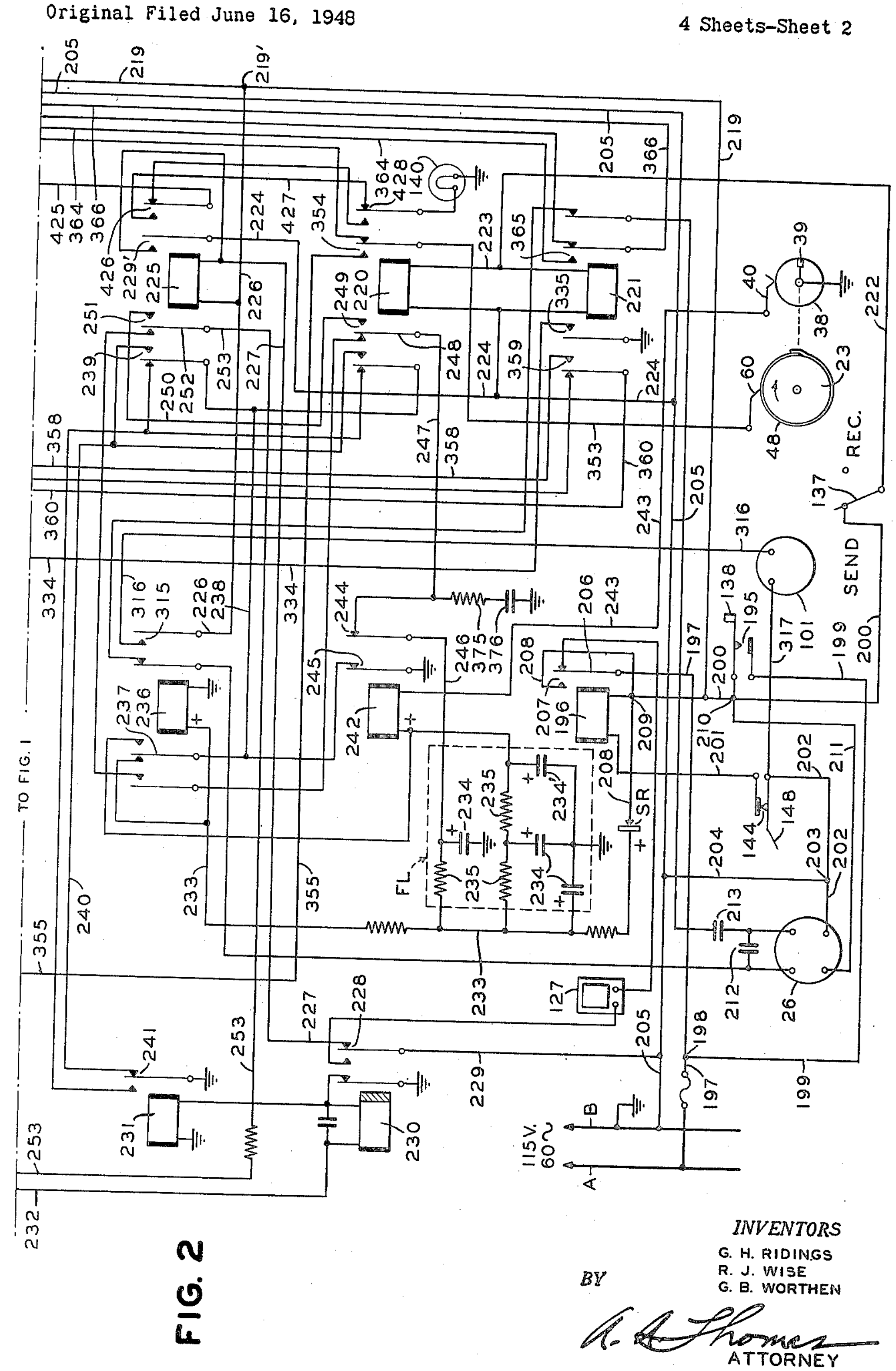
Figure 3:
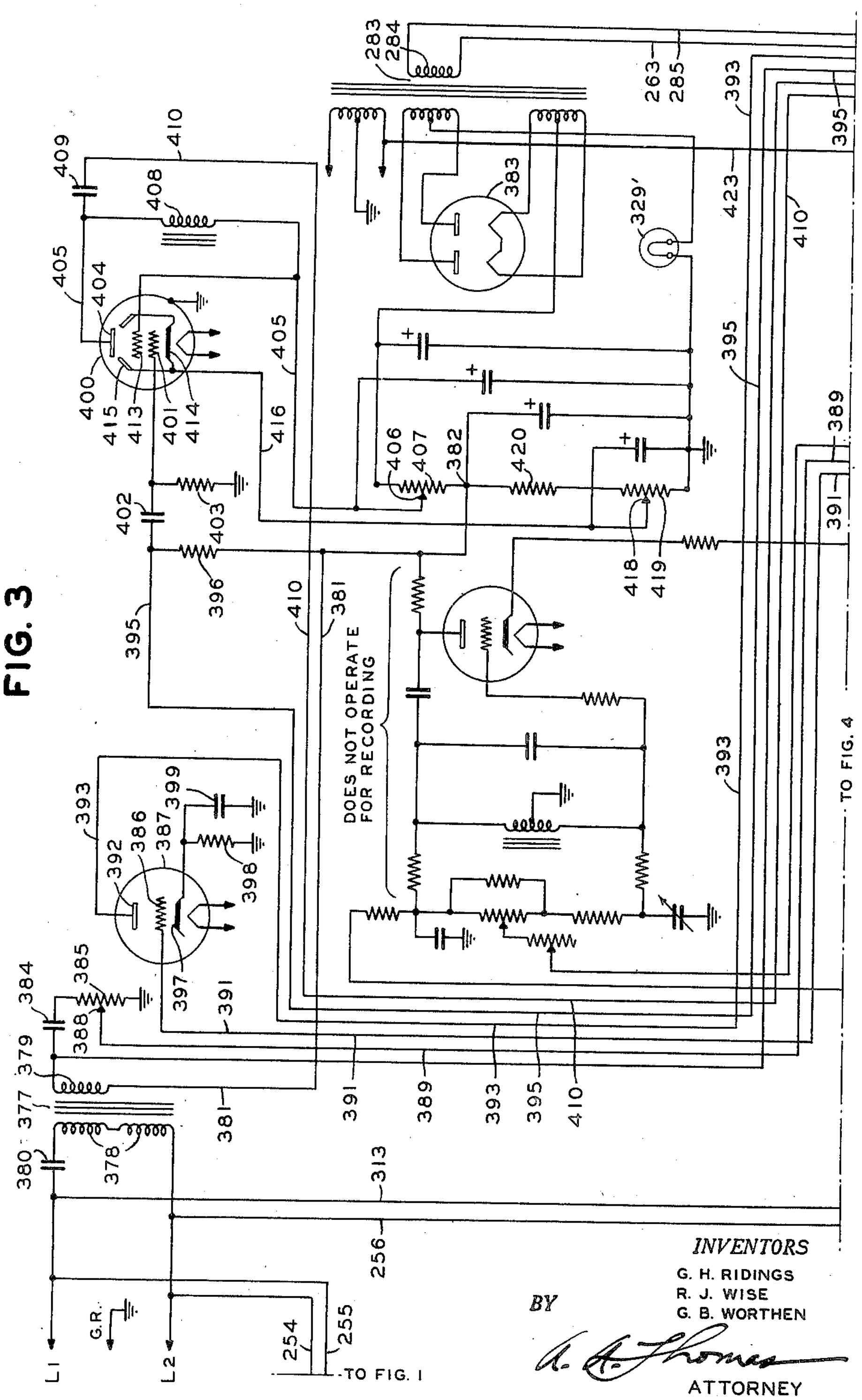
Figs. 3 and 4 show the circuits when the machine operates as a receiver.
Figure 4:
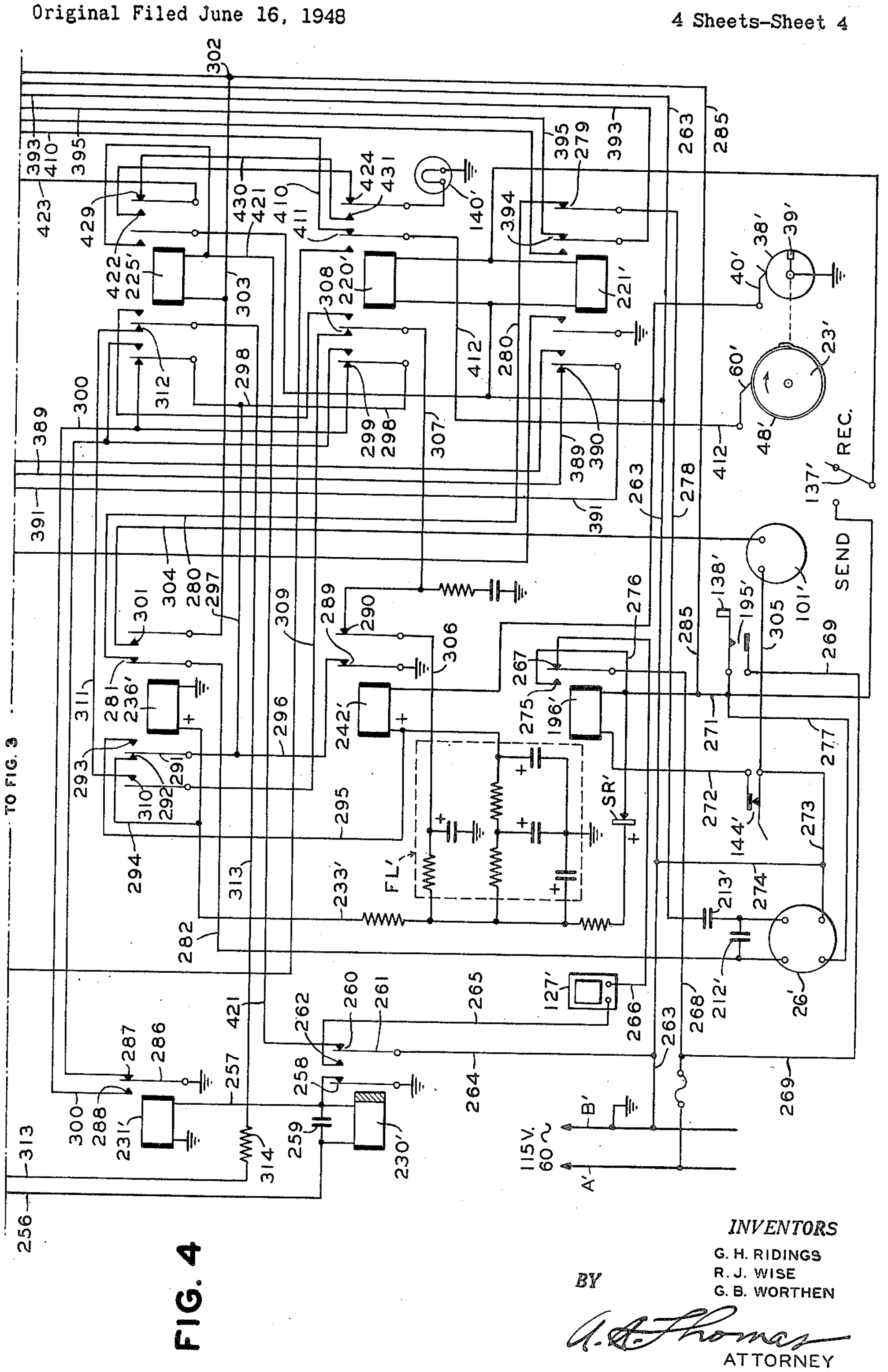

To understand the circuits of our system we should place Fig. 1 above Fig. 2 for the transmitter and place Fig. 3 above Fig. 4 for the receiver. In other words, Figs. 1 and 2 constitute the transmitter circuits and Figs. 3 and 4 represent the receiver circuits. Although these two circuit groups appear to be duplicates, as illustrated, they differ functionally during the operation of the system and for that reason it is necessary to show the circuits for each machine. However, a description of Figs. 1 and 2 will also apply to Figs. 3 and 4 except for the functional differences in the transmitting and recording operations.

It will be convenient to use the same reference numerals for certain corresponding parts in Figs. 3 and 4 except that a prime mark will be added to indicate the parts pertaining to the receiver. For example, the synchronous motor that drives the drum is numbered 26 in the transmitter (Fig. 2) and 26' in the receiver (Fig. 4). Otherwise the numbering will proceed consecutively in order to prevent confusion between transmitter and receiver operations which involve similar parts. In tracing the circuits we shall use the convenient term "wire" to indicate any practical form of electrical connector.

The source of power for the machine is a 115-volt, 60-cycle generator which is represented diagrammatically by a pair of bus bars A and B. When the start button 138 is momentarily pushed in, it closes a switch 195 which energizes a relay 196 through the following circuit: From bus bar A, conductor 197 to point 198, wire 199, switch 195, wire 200, the winding of relay 196, wire 201, through the closed end-of-message switch 144, wire 202 to point 203, and wire 204 to conductor 205 which goes to the grounded bus bar B. The energized relay 196, which we call the power relay, locks from conductor 197 through its tongue 206 and contact 207, wire 208 to point 209, and from there through the relay to bus bar B as above described. The power relay 196 remains energized till the close of a scanning operation.

The synchronous motor 26 which drives the drum 23 is energized from bus bar A through conductor 197, relay contacts 206—207, wire 208 to point 209, wire 200 to point 210, wire 211 through the motor windings (including the condenser 212 which is part of the motor), wire 202 to point 203, wire 204, and from there through conductor 205 to bus bar B. The motor 26 has an additional condenser 213 which does not function when the machine operates as a transmitter. We are to remember that the closing of start switch 195 causes the motor 26 to drive the drum 23 and the commutator 38 at synchronous speed.

The operation of relay 196 in Fig. 2 puts power on the amplifier circuits of Fig. 1 through the energizing of input transformer 214 which consists of a primary coil 215 and three secondary coils 216, 217 and 218. The primary 215 is connected to bus bars A and B by way of leads 205 and 219 through the closed contacts 206—207 of relay 196. A further function of this relay is to complete the circuits of relays 220 and 221 through its contacts 206—207, wire 200, closed switch 137, conductor 222 to wire 223, through both relays in parallel to wire 224, and through conductor 205 to bus bar B.

Another relay 225 is energized upon operation of power relay 196 through the following connections: From bus bar A through the closed relay contacts 206—207 to wire 200, through conductor 219 to point 219′ by wire 226 through relay 225, then by wire 227 to closed relay contact 228, and by wire 229 to bus bar B. Relay 225 locks through contact 229′ which is connected to wire 224. There are two line relays 230 and 231 which are connected by a wire 232 to transmission line L2, but these relays are not energized at this time so they require no further mention here except to say that the relay 230 is of the slow-to-release type for a purpose that will appear later.

A suitable rectifier SR (for example, of the selenium type) is connected to the bus bars A—B through the closed relay contacts 206—207 and wire 208. If this rectifier has only a half-wave output, we provide a filter network to produce a fairly constant voltage in the positive output lead 233. In Fig. 2, this filter network is indicated in a diagrammatic way by the dotted outline FL, including condensers 234—234′ and resistors 235 which are connected as shown. Filters of this kind are well known. The result is a direct current (say, of 120 volts) with a slight ripple but sufficiently steady for relay operation, so we may consider the rectifier SR as a source of battery current and the line 233 may be called the positive battery lead. How the ripple component of this direct current is prevented from affecting the stylus circuit in the recorder mechanism will be explained in due course.

A relay 236 (near the top of Fig. 2) is connected at the plus side to the battery lead 233 and the other side of the relay is grounded. However, at this time the relay 236 is not energized because it is short-circuited through its closed contact 237, wire 238, closed contact 239 of energized relay 225, wire 240 and through the grounded contact 241 of relay 231 which is not energized at this moment. The relay 236 will be designated the phasing relay because it is operated from the receiver at the phasing moment of the system to energize the stylus motor 101, as will be made clear when we describe the automatic phasing operation.

A direct-current relay 242 has one side connected directly to the plus terminal of filter condenser 234′ and the other side of the relay goes by a wire 243 to the commutator brush 40. Therefore, every time this brush touches the grounded contact 39 (that is, once for each revolution of drum 23) the charged condenser 234′ discharges directly through the relay 242, which is thus energized for a moment to open its contacts 244 and 245. In other words, the relay 242 pulses in synchronism with the transmitter drum 23.

During the intervals when the brush 40 passes over the insulated periphery of commutator 38, the relay 242 is not energized and battery flows from line 233, wire 246, closed relay contact 244, wire 247, contacts 248—249 of energized relay 220, wire 250, contacts 251—252 of energized relay 225, and by wire 253 to line L1. The battery thus put on line L1 of the transmitter is therefore interrupted every time the pulse relay 242 is energized. The transmitter line L1 is connected by a wire 254 to line L2 of the receiver (Fig. 3), and a wire 255 connects line L2 of the transmitter to line L1 of the receiver. In other words, the transmission lines of the two machines are cross-connected, for control in each direction with ground return (marked G. R.).

Summarizing what has happened so far at the transmitter when the start button 138 is pressed, we have this series of events taking place at once: The motor 26 rotates the drum 23 and the phasing commutator 38 at synchronous speed; the transformer 214 is energized to put power into the amplifier circuits; and battery pulses are sent to line L1 of the transmitter at a frequency corresponding to the synchronous rotation of the drum. Nothing else happens at the transmitter up to this moment.

Turning now to the receiver, the battery pulses from the transmitter go over wire 254 to line L2 in the receiver where a wire 256 connects the line relays 230′ and 231′ to line L2. These relays are connected in series by a wire 257, but the relay 231′ is shorted out by the grounded contact 258 of relay 230′ when the latter is not energized. Relay 230′ is shunted by a large condenser 259 and is of a type that is slow to release.

The receiver relay 231′ follows the pulses of the transmitter relay 242 because the relay 230′ does not release during the short intervals between pulses, so that the relay contact 258 remains open to remove the short circuit from relay 231′. At the same time the open contact 260 of energized relay 230′ prevents the operation of relay 225′, while the closed contacts 261—262 cause the operation of the call buzzer 127′. The buzzer circuit goes from bus bar B′ to conductor 263, wire 264, relay contacts 261—262, wire 265 through the buzzer coil, wire 266, closed contact 267 of power relay 196′ (not energized now) and by wire 268 to bus bar A′.

On hearing the buzzer, the attendant at the receiver places a recording blank 48′ on the drum 23′, throws the switch 137′ to "Receive" (or open) position and presses the start button 138′. This operates the power relay 196′ from bus bar A′, wire 269 through the closed start switch 195′, wire 271, through the relay winding, wire 272, closed switch 144′, wire 273, and by wire 274 to the other bus bar B′. When the energized relay 196′ opens its contact 267, the circuit of buzzer 137′ is broken. The relay 196′ locks through its closed contact 275, so that the operator can release the start button 138′ at once.

The synchronous motor 26′ of the receiver is energized in such a way as to include not only its regular condenser 212′ but also the extra condenser 213′ which causes the motor to drift or run below synchronous speed. The motor circuit including the condenser 212′ can be traced from bus bar A′, conductor 268, closed relay contact 275, wires 276, 271 and 277 through the motor windings and condenser 212′, and by wire 274 to bus bar B'. The drifting condenser 213' is connected in circuit by wire 278 and closed contact 279 of relay 221' (not energized because switch 137' is open), wire 280, closed contact 281 of phasing relay 236' (not energized now) and by wire 282 to the motor terminal.

The energized relay 196' also connects the power input transformer 283 of the amplifier with the source of power A'—B' from lead 263 through the primary coil 284, conductor 285 and from there through the closed relay contact 275 to bus bar A'. It should be noted that the three relays 220', 221' and 225' are not energized when the machine is set up as a recorder, so that their respective contacts remain as shown in Fig. 4.

The operation of power relay 196' energizes the rectifier SR' which with its filter network FL' supplies a fairly constant voltage to the output lead 233' as previously described for the corresponding parts SR and FL in Fig. 2 of the transmitter circuits. This means that the pulse relay 242' of the receiver is energized every time its circuit is grounded through the commutator 38'.

We have, then, this condition in the receiver when the start button 138' is pressed by the attendant: The motor 26' rotates the drum 23' and the commutator 38' at slightly less than synchronous speed. At the same time, the line relay 231' keeps pulsing in tune with the pulse relay 242 of the transmitter. We utilize this condition to put the two machines into phase with each other by the following novel method and control circuits.

*The automatic phasing operation*

It should be noted that at this time we have only the two drum motors 26 and 26' in operation. The two stylus motors 101 and 101' are not yet running, so that no facsimile transmission is taking place. Before that can happen the two scanning drums must be rotating in phase and that is accomplished by bringing the drifting motor 26' up to synchronous speed at a moment when the two drums are in the same angular position.

Let us remember that the line relay 231' of the receiver pulses in response to the synchronous speed of the transmitter motor 26, while the relay 242' pulses at the speed of the drifting motor 26' which runs slightly below synchronism. Every time the relay 231' pulses its grounded tongue 286 opens the contact 287 and grounds the other contact 288. At each pulse of relay 242' the ground is removed from contact 289 and the other contact 290 is opened.

One side of the phasing relay 236' in the receiver is connected to the battery lead 233' and the other side of the relay is grounded. The relay 236' has a tongue 291 associated with a break contact 292 and a make contact 293. The contact 292 is connected to the battery lead 233' by a wire 294. The contact 293 is connected to the pulse side of relay 242' by a wire 295. The tongue 291 is grounded in two ways: First, by a wire 296 to the grounded contact 289 of relay 242'. Second, by wires 297 and 298 to the closed contact 299 of relay 220' (not energized) and by wire 300 to the grounded tongue 286 when the relay 231' is energized during a pulse.

It is seen, then, that the relay 236' is grounded out by a short circuit either when the relay 231' is energized or when the relay 242' is released. Only at the instant when the relay 231' releases and the relay 242' pulls up will the ground be removed from contact 291 of relay 236' which will then be energized. Since the simultaneous release of relay 231' and the pulsing of relay 242' can occur only when the commutator contacts 39 and 39' are in the same angular position, it follows that the relay 236' is energized when the two drums 23 and 23' are running in phased relationship.

The operation of the phasing relay 236' at the receiver disconnects the drifting condenser 213' by opening the contact 281, so that the motor 26' now runs at synchronous speed and the scanning drums 23 and 23' operate in unison. The opening of contact 292 removes the ground therefrom and keeps the relay 236' energized during a transmission cycle, while the closing of contact 293 short-circuits the pulse relay 242' through wire 295, contact 293 and by wire 296 to the grounded contact 289 when relay 242' releases. The closing of contact 301 of energized relay 236' operates the stylus motor 101' from lead 268, closed contact 275 of power relay 196', wires 276 and 271, conductor 285 to point 302, wire 303, contact 301, wire 304, through the motor windings, and by wires 305—273—274—263 to bus bar B'.

When the pulse relay 242' is short-circuited by the closing of contact 293 of the energized phasing relay 236', the pulse relay no longer responds to the commutator 38'. As a result steady battery is applied to line L1 of the receiver from lead 233' to wire 306, closed contact 290 of relay 242' (now released), wire 307, closed contact 308 of relay 220' (not energized), wire 309, closed contact 310 of energized relay 236', wire 311, closed contact 312 of relay 225' (not energized), wire 313 and through resistor 314 to line L1.

Now let us see what happens at the transmitter in response to the steady battery coming from the receiver. This battery goes through transmission line 255 to line L2 of the transmitter where it operates relays 230 and 231. The opening of contact 241 of relay 231 removes one ground from contact 237 of relay 236 but this contact is still connected to another ground through closed contact 245 of relay 242 which has not yet operated. The next revolution of commutator 38 closes the circuit of relay 242 which opens its contact 245 and removes the second ground from contact 237. This allows relay 236 to be energized and pull up its contact 315, thereby closing the circuit of stylus motor 101 through wires 316—226—219 and through closed contacts 206—207 of the energized power relay 196 to bus bar A. The other side of the stylus motor goes to bus bar B through wires 317—202—204—205.

The stylus motors 101 and 101' of both machines are therefore started simultaneously when the two drums 23 and 23' are in phase, whereupon the stylus carriage 50 of each machine is automatically lowered to scanning position and facsimile transmission begins. The automatic phasing method we have described is one of the important features of our system for it eliminates the phasing clutch used in larger and more expensive machines. The phasing clutch is not only a costly item but adds to the weight and size of the machine. We believe that we are the first to phase two connected facsimile machines by drifting the speed of one machine relative to the other until the proper phase relationship is established, and we claim this feature of our invention in a fundamental way.

*Facsimile transmission with an electric stylus*

As previously explained, the subject copy mounted on the transmitter drum 23 may consist either of conducting characters on an insulating surface or of insulating characters on a conducting sheet. In either case there is a variation of resistance as the stylus passes from character to background and from background to character. These resistance variations are utilized to modulate the output of a vacuum tube oscillator in such a way that carrier is sent to the lines L1 and L2 of the transmitter only when the stylus passes over the characters.

Referring to Fig. 1, the secondary coil 216 of the power input transformer 214 furnishes current for the heaters 318 of an oscillator tube 319 and an output tube 320. The secondary 217 goes directly to the plates 321 of a full wave rectifier 322, and the filaments 323 of this tube are heated by the secondary 318. The leads 324 and 325 represent the direct current output of rectifier 322, with the points 326 and 327 as the output terminals. Condensers 328 and a resistor 328*a* form a cascade filter to smooth out the ripples of the rectified waves. A fuse lamp 329 is inserted in one of the rectifier leads to act as a pilot light (showing that the power is on) and also to protect the transformer 214 and rectifier 322 by limiting the current. The rectifier 322 also supplies current to the output unit 330 of the recording amplifier, but as this part is not used in transmitting we may disregard it here.

The plate 331 of oscillator tube 319 is connected to a voltage tap 332 of the rectifier output or plate supply and the cathode 333 of this tube is connected by a wire 334 to contact 335 of relay 221. Since this relay is energized upon operation of start button 138, the contact 335 (and therefore the cathode 333) is grounded at this time. Conductors 336 and 337 are connected respectively to plate 331 and grid 338 of tube 319 and the points 339—340 represent the output terminals of the oscillator. An inductance coil 341 and a condenser 342 connected across the conductors 336—337 constitute the oscillator circuit which provides the carrier for the transmission of facsimile signals. In an actual embodiment of our system we found it convenient to use a carrier frequency of about 1800 cycles so that it could be operated over any telephone pair.

In Fig. 1 there is a dotted rectangle marked BX. The parts within the rectangle constitute a bridge network which is unbalanced to transmit signals when the stylus 60 passes over a marked area. This network is reproduced in Figure 1A in conventional bridge form so that the operation is easier to follow. The four bridge arms of this network are marked E—F—G—H. The output terminals 339 and 340 of the oscillator form the input terminals of the bridge and this input voltage of the oscillator is constant. The two points 343 and 344 in the cross connection 345 constitute the output terminals of the bridge network which is balanced when those two points are at equal potential.

The output terminal 343 is an adjustable tap on a potentiometer 346 which extends into both arms E and F. The opposite terminal 344 is the grounded middle point of the oscillator coil 341 which extends into both arms G and H. The bridge is balanced by adjusting the resistor tap 343, and to make that adjustment less critical we shunt a resistor 347 around the potentiometer 346. The bridge arm E includes a resistor 348 and the opposite arm F contains two resistors 349 and 350. The cross connection 345 contains an adjustable resistor 351 which goes to the grid 352 of output tube 319 through connections to be presently described.

The transmitter stylus 60 is connected to bridge arm E through conductor 353 (Fig. 2), closed contact 354 of energized relay 220, wire 355 and through a high resistor 356 to point 357 on arm E. In Fig. 1A the connection between stylus 60 and bridge arm E is reduced to the simple line 353. For purposes of description we shall assume that the stylus scans a message sheet where the conducting sheet 155 bears wax characters 156. It will be convenient to refer to the resistance of the message sheet (whether insulating or conducting characters are used) as the paper resistance of that portion of the stylus circuit which extends from point 357 on bridge arm E to ground at the middle point 344 of oscillator coil 341.

We thus have a bridge network in which the stylus circuit with its variable paper resistance is shunted around a part of arm E and the entire arm G. Suppose the bridge is to be balanced for the transmission of copy like that shown in Fig. 1A. When the stylus 60 is placed directly on the conductive sheet 155, the paper resistance in the stylus circuit is at a minimum. The operator adjusts the potentiometer 346 until a minimum voltage is indicated in a testing motor connected across the lines L1 and L2 of the transmitter. This shows that the points 343 and 344 of the network are at equal potential and the output of the bridge is a minimum.

The same procedure is followed to balance the bridge for a message sheet consisting of conductive marks on an insulating surface. Here again the stylus is placed on the background of the sheet but this time the paper resistance in the stylus circuit is a maximum, being practically at infinity, since the top surface 153 of the sheet is of insulating material. This condition requires a different adjustment of potentiometer 346 to obtain equal voltages at the output points 343 and 344.

In either case the balanced bridge BX prevents signals from going over the lines L1 and L2 when the stylus 60 rides over the unmarked background of the message sheet. However, when the stylus touches a marked area of the sheet, the resistance in the stylus circuit changes (either increasing or decreasing) and this produces a difference of potential between the output points 343 and 344 of the bridge, so that a current flows through the cross-connection 345. A variable proportion of this output voltage is sent to the grid 352 of tube 320 through the adjustable resistor 351, wire 358, closed contact 359 of energized relay 221 (Fig. 2) and by wire 360 to grid 352.

The plate circuit of output tube 320 is energized from the plus potential point 332 of the rectifier output (we use about 250 volts) by wire 361 through the primary coil 362 of the output transformer 363, wire 364, closed contact 365 of energized relay 221 (Fig. 2) and by wire 366 to plate 367 of the tube. The cathode 368 of this tube is grounded through the usual arrangement 369 of a bias resistor and a by-pass condenser.

Those familiar with this art will understand that the signal voltages impressed on grid 352 of output tube 320 when the stylus 60 passes over a marked area of the message sheet cause corresponding current variations in greatly amplified form to pass through the primary coil 362. The voltage thus induced in the secondary coil 370 of transformer 363 is sent over the transmission lines L1 and L2 to the receiver. The output frequency of the oscillator circuit produced by the elements 341—342 is the carrier for the facsimile signals impressed on grid 352 of output tube 320.

In addition to what we have already said about the construction and operation of the bridge network BX, we call attention to the practical advantages of several features included therein. The high resistor 356 in the stylus circuit decreases the sensitivity of the bridge due to resistance variations that are liable to occur in different sheets of the same kind of paper used. Further, to counterbalance the condenser effect of the shielded wire from stylus to amplifier we insert a condenser 371 in arm E and a condenser 372 in arm F. The condenser 372 is of light capacity and preferably adjustable to take care of different length of shielded cable running from the machine itself to the amplifier and control box.

Regarding the use of the bridge circuit in facsimile transmission by an electric stylus from a sheet having marked and unmarked areas of different resistances, we should explain that this idea is the invention of Frank T. Turner as set forth in his copending application Serial No. 23,534, filed April 27, 1948, now Patent No. 2,607,844, issued August 19, 1952, and we do not herein make any claim readable on the disclosure of the Turner patent.

There are some other details in Figs. 1 and 2 which we shall briefly note before taking up the description of the receiver circuits. Referring to the signal output transformer 363, there are a condenser 373 and a grounded potentiometer or variable resistor 374 connected to one side of the primary coil 362. When the machine operates as a transmitter, the adjustable tap on the resistor 374 is cut out and the two elements 373 and 374 function as a low-pass filter which helps to remove such high frequencies as may be detrimental or undesirable in the transmission of facsimile signals. In the local pulse relay 242, where the contact 244 is connected to the direct current voltage line 233, we add a resistor 375 and a grounded condenser 376 to that contact in order to reduce sparking and interference.

*Recording operation of the transceiver*

We have already explained how the machine is set going as a receiver when the attendant, in answer to the call buzzer, presses the start button 138'. Let us now observe how the receiver responds to the facsimile signals coming from the transmitter.

At the signal input end of the recording amplifier (Fig. 3) is a transformer 377 with a primary coil 378 and a secondary coil 379 which is isolated from battery current by a condenser 380. One side of the secondary 379 goes by a wire 381 to a voltage tap 382 in the output of a vacuum tube rectifier 383 which is connected to the power input transformer 283 as described for the rectifier 322 in Fig. 1. The other side of the secondary coil 379 is connected through a condenser 384 and a potentometer 385 to the grid 386 of an input tube 387. This connection goes from the variable resistor tap 388 by a wire 389, closed contact 390 of relay 221' (not energized for recording) and by wire 391 to grid 386. The potentiometer 385, therefore, controls the signal voltage of tube 387 for recording.

The plate 392 of the signal input tube 387 is connected to the voltage tap 382 of rectifier 383 through the following circuit: by wire 393 to the closed contact 394 of relay 221' (not energized), wire 395 and through resistor 396 to point 382. The cathode 397 of tube 387 is connected to ground through a bias resistor 398 and a by-pass condenser 399.

The signal input tube 387 is coupled to a beam power tube 400 which forms the output of the recording amplifier. The control grid 401 of this tube is connected to conductor 395 through a condenser 402 and a grounded resistor 403, whereby the plate crcuit of tube 387 controls the output of tube 400. The plate 404 of tube 400 is connected by wire 405 to an adjustable voltage tap 406 on a resistor 407 in the output circuit of rectifier 383. An inductor 408 is included in wire 405 to act as a low impedance coupling between the output tube 400 and the recording stylus 60' (Fig. 4). The recording circuit includes wire 405, condenser 409, wire 410, closed contact 411 of relay 220' (not energized) and wire 412, to which the stylus 60' is connected.

The screen grid 413 of beam tube 400 is connected to wire 405 and therefore to the voltage tap 406. The cathode 414 and the beam plate 415 of tube 400 are connected by a wire 416 to an adjustable voltage tap 418 on a resistor 419 in the output of rectifier 383. A third resistor 420 in the rectifier output is in series with the variable resistors 407 and 419 to form a voltage divider for tubes 387 and 400. In a typical adjustment for a receiver we used 280 volts at point 406 for the plate and screen grid voltage of tube 400; at point 382 we used 240 volts for the secondary 379 of input transformer 377 and the plate voltage of input tube 387; and at point 418 we used about 18 volts for the cathode 414 and beam plate 415 of output tube 400. These figures, of course, are given merely by way of example.

From the preceding description of the recording amplifier it will be seen that facsimile signals from the transmitter arc superimposed on the direct current in the secondary coil 379 of input transformer 377 and impressed upon the grid 386 of input tube 387. This tube amplifies the signals which then go to the control grid 401 of beam tube 400 for further amplification. The plate output of tube 400 goes through condenser 409 to the recording stylus 60' which causes the signal impulses to be recorded on electrosensitive paper in a manner well understood by facsimile experts. Since signal impulses are sent from the transmitter to the receiver only when the transmitting stylus passes over characters on the message sheet, the recording stylus produces a positive copy of the original message without the need of signal inverters used in prior facsimile systems.

The amplifier circuits shown in Figs. 1 and 3 contain certain novel features of practical importance. As we said in the beginning of this specification, the primary object of this invention was to produce a facsimile machine and system of extreme simplicity and low cost. To that end we designed a machine that works equally well for transmitting and recording, it being only necessary to throw a switch to set the machine for either operation. The amplifier unit connected with the machine serves both for transmitting and recording with certain parts used for both operations and other parts used for transmitting or receiving only.

Thus, we require but four vacuum tubes of which only three are in operation for transmitting (oscillator tube 319, output tube 320 and rectifier tube 322 in Fig. 1) and only three tubes operate for recording (rectifier tube 383, input tube 387 and output tube 400 in Fig. 3). Only two transformers, a power input transformer (214 in Fig. 1 and 283 in Fig. 3) and a transformer connected to the lines L1 and L2 for operating as a signal output in transmitting (transformer 363 in Fig. 1) and operating as a signal input for recording (transformer 377 in Fig. 3).

For direct current control, we preferably use a selenium rectifier because it is a small inexpensive device which furnishes sufficiently steady current for operation of the relays. The vacuum tube rectifier (322 in Fig. 1 and 383 in Fig. 3) is so small that it could not carry the additional load of providing power for the relays. A more powerful rectifier would be too large and expensive for our purpose, so that by using the selenium rectifier for relay control we cut down the size and cost of the machine.

When our amplifier operates for transmitting, we use only one amplifying tube, namely 320, into which the signals are fed from the bridge BX. In the recording operation, where the oscillator and bridge are entirely cut out, the incoming signals are amplified by the input triode 387 (which corresponds to tube 320 in Fig. 1) and the output pentode 400 to which the recording stylus is connected.

In designing the amplifier for recording operation, we had to consider the fact that the direct current supplied by the selenium rectifier (SR or SR′) was not free from rippling even after passing through the connected filter (FL or FL′) and that this direct current had to be connected to the output transformer 363 when transmitting. In other words, the facsimile signals received by the input transformer 377 in Fig. 3 are mixed with a ripple or hum voltage at a much higher level than the received signal voltage. It is necessary to reduce this ripple or hum voltage far below the signal level so that the hum will not be recorded. This result is accomplished by the following filter circuits and devices.

Referring to Fig. 3, the parts that primarily perform the function of filtering ripples out of the stylus circuit are the three condensers 380, 384 and 402 and the output choke or inductor 408. These condensers are of low capacity so that the higher signal frequencies will be passed and amplified much more than the low ripple or humming frequencies. Condenser 380 also prevents direct current from being shunted from line L1 to line L2 through the primary winding 378 of transformer 377, thereby allowing proper operation of the control circuits. Condenser 384 blocks direct current from the grid 386 of tube 377.

Of special importance is the inductor 408 which is used in place of the output transformer found in prior recording amplifiers, so that we have here another cost reducing item. The inductor 408 has a very low impedance to hum and ripple which are therefore shunted out of the stylus circuit, while the higher frequency will not go through the inductor. Condenser 409 prevents direct current from reaching the stylus 60′ which thus operates to record only the facsimile signals received from the distant transmitter.

*Transmission and recording of short messages*

We explained heretofore that the operation of switch 144 (or 144′) by the scanning carriage at the end of a long message automatically shuts down both machines. However, when sending a short message, the operator at the transmitter has to open the end-of-message switch 144 by hand after the complete message has been scanned. This shuts down the transmitter, but in the receiver the end-of-message switch 144′ remains closed because the scanning carriage has not reached the end of its travel.

To understand what happens at the receiver at the close of transmitting a short message, we should bear in mind that during transmission steady battery is applied to line L1 of the transmitter and goes to line L2 of the receiver where it keeps the line relays 230′ and 231′ energized. The open contact 260 of relay 230′ prevents the relay 225′ from being operated. Now, when the attendant at the transmitter closes the end-of-message switch 144 by hand, he takes all power off the transmitter and stops battery to line L2 of the receiver, thereby releasing the relays 230′ and 231′.

With the relay contact 260 now closed, the relay 225′ is energized from bus bar B′ through conductor 264, contact 260, wire 421, through the relay winding, wires 303—285—271—276, closed contact 275 of the energized power relay 196′ and by wire 268 to bus bar A′. The closed contact 422 of energized relay 225′ lights the signal lamp 140′ from the power transformer 283 (Fig. 3) through conductor 423 and the closed contact 424 of relay 220′ (not energized during recording). The lighted lamp 140′, which shines through the colored jewel 139 in the front panel of the machine, tells the attendant at the receiver that the message is through and thereupon he opens his end-of-message switch 144′ by hand. The machine is now shut down.

In a machine like the one used in this system for transmitting and recording, it is to be expected that occasionally the operator will start the machine with the switch 137 (or 137′) in the wrong position. To remind the attendant instantly of that fact and also to prevent any harm being done the machine when that happens, we have incorporated certain safety features in the circuits.

Suppose the machine is to be operated as a transmitter with the switch 137 accidentally left in "Receive" position. When the operator presses the start button 138, the drum motor 26 operates, the relay 225 is energized and power is put into the transformer 214. The lamp 140 (Fig. 2) lights from the transformer 214 through wire 425, closed contact 426 of energized relay 225, wire 427, closed contact 428 of relay 220 (not energized) and through the lamp to ground. No battery is sent to the line to call the receiver and the scanning carriage remains in raised position. The lamp 140 (shining through a red jewel) warns the operator that something is wrong and he will throw the switch 137 to "send" position, whereupon the machine will operate as previously described.

If the receiver should be set up by mistake as a transmitter after a call has been received, the pressing of start button 138′ (Fig. 4) will operate relay 220′ but relay 225′ will not be energized due to the open contact 260 of energized relay 230′. Therefore, the signal lamp 140′ will be lighted from transformer 383 (Fig. 3) through wire 423, closed contact 429 of inert relay 225′, wire 430, closed contact 431 of energized relay 220′ and through the lamp to ground. When the signal light appears, the attendant will operate the end-of-message switch by hand to turn the machine off, throw the switch 137 to "Receive" position and restart the machine, which will now be in condition to record the received signals. Of course, it is understood that a buzzer or other indicator may be used with or in place of lamp 140'.

While we have shown and described the novel features of our invention by means of certain specific circuits, it will be apparent that our invention is not limited to the details set forth, for various changes and modifications are possible within the scope of the appended claims.

We claim as our invention:

1. A facsimile system having a transmitter and a receiver adapted to be operatively connected, each machine having a rotary drum and a synchronous motor for driving the same at scanning speed for transmitting and recording respectively, means at the receiver for causing its synchronous motor to drift at the start while the transmitter motor is running at synchronous speed, mechanism at the transmitter for generating pulses in phase with the synchronous speed of the transmitting drum, mechanism at the receiver for generating pulses in phase with the drifting speed of the recording drum, and means at the receiver including a relay controlled jointly by said two sets of pulses for automatically causing the recording motor to run at synchronous speed when the two rotating drums are in phased angular relationship.

2. A facsimile system having a transmitter and a receiver adapted to be operatively connected, each machine having a rotary drum and a synchronous motor for driving the same at scanning speed for transmitting and recording respectively, means at the receiver for causing its synchronous motor to drift at the start while the transmitter motor is running at synchronous speed, mechanism at the transmitter for generating pulses in phase with the synchronous speed of the transmitting drum, mechanism at the receiver for generating pulses in phase with the drifting speed of the recording drum, means at the receiver including a phasing relay controlled jointly by said two sets of pulses for causing the recording motor to run at synchronous speed when the two rotating drums are in phased angular relationship, a recording device operated in response to the energizing of said phasing relay, a phasing relay at the transmitter automatically energized in response to the operation of the phasing relay in the receiver, and a scanning device in the transmitter set in operation by the energizing of said transmitter relay.

3. A facsimile system having a transmitter and a receiver adapted to be operatively connected, a scanning drum at the transmitter and a recording drum at the reeciver, a synchronous motor for each drum to operate the same at predetermined constant speed, the recording motor having means for causing it to run slightly below synchronous speed at the start, a pair of relays at the receiver, a source of pulses at the transmitter for operating one of said relays which is momentarily released in response to the synchronous speed of the scanning drum, a source of pulses at the receiver for energizing the second relay in response to the non-synchronous speed of the recording drum, and a device at the receiver automatically operated at the instant when the first relay is released and the second relay is energized for causing the recording motor to run at synchronous speed, the operation of said device occurring when the two drums are in the same angular position.

4. A facsimile system having a transmitter and a receiver adapted to be operatively connected, each machine having a rotary drum and a synchronous motor for driving the same at scanning speed, means at the receiver for causing its synchronous motor to drift at the start while the transmitter motor is running at synchronous speed, mechanism at the transmitter for generating pulses in phase with the synchronous speed of the transmitting drum, mechanism at the receiver for generating pulses in phase with the drifting speed of the recording drum, a relay at the receiver responsive to said synchronous pulses, a second relay at the receiver responsive to said non-synchronous pulses, and a third relay at the receiver automatically operated at the instant when the first relay is released and the second relay is energized for causing the recording motor to run at synchronous speed, said pulse mechanisms including connections for causing the operation of said third relay to occur only when the two rotating drums are in phased angular relationship.

5. A facsimile system having a transmitter and a receiver adapted to be operatively connected, a scanning drum in the transmitter and a recording drum in the receiver, a synchronous motor for driving each drum at constant scanning speed, the recording motor having means for causing it to run below synchronous speed, a phasing commutator associated with each drum and rotatable therewith, each commutator having a contact which determines the starting position of the associated drum, a relay at the receiver adapted to be energized by a circuit controlled by the transmitter commutator whereby said relay pulses at the synchronous speed of the transmitter drum, a second relay at the receiver adapted to be energized by a circuit controlled by the receiver commutator whereby the second relay pulses at the non-synchronous speed of the recording drum, and apparatus in the receiver jointly controlled by said relays for automatically bringing the recording motor up to synchronous speed when the commutator contacts are both in circuit, the circuit closing position of said contacts corresponding to the starting position of said drums.

6. A facsimile system comprising a transmitter and a receiver adapted to be operatively connected, each machine having a rotary drum and a synchronous motor for driving the same at scanning speed, the synchronous motor at the receiver being provided with means for causing the motor to drift at the start, a commutator switch rotatable with each drum and closed once for each revolution of the drum when the latter is in starting position with respect to its scanning element, apparatus at the transmitter for generating direct current pulses which are interrupted by the closing of the commutator switch in synchronism with the scanning speed of the transmitter drum, a relay in the receiver adapted to be energized by said synchronous pulses, a second relay in the receiver adapted to be energized when the associated commutator switch is closed so that the second relay pulsates in synchronism with the recording drum as operated by said drifting motor, a phasing relay in the reeciver normally held inoperative, connections for automatically energizing said phasing relay at the instant when the first relay is released and the second relay is energized whereby the phasing relay is operated when both drums are in starting position, means responsive to the operation of said phasing relay for synchronizing said drifting motor and thereby causing the phased receiver drum to rotate in synchronism with the transmitter drum, and mechanism in the transmitter for operating its scanning element in automatic response to the energizing of the phasing relay in the receiver.

References Cited in the file of this patent

UNITED STATES PATENTS

| Number | Name | Date |
|---|---|---|
| 1,580,225 | Watson | Apr. 13, 1926 |
| 1,897,796 | Fulton | Feb. 14, 1933 |
| 2,153,858 | Wise | Apr. 11, 1939 |
| 2,266,802 | Ressler | Dec. 23, 1941 |